Oct. 28, 1930.  F. W. C. NEUNER  1,779,634
LAMP BULB KIT
Filed Aug. 17, 1928
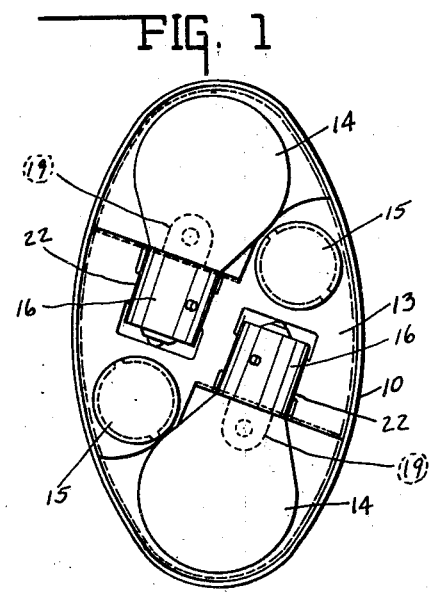
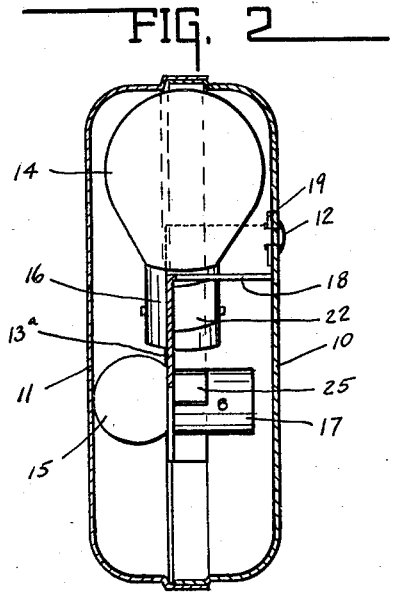
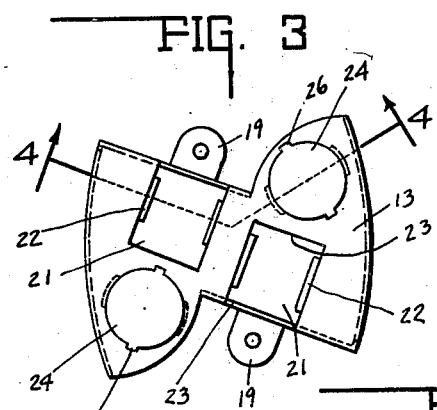
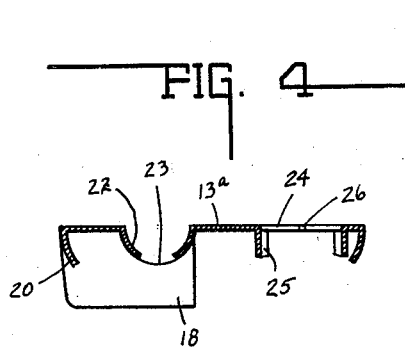
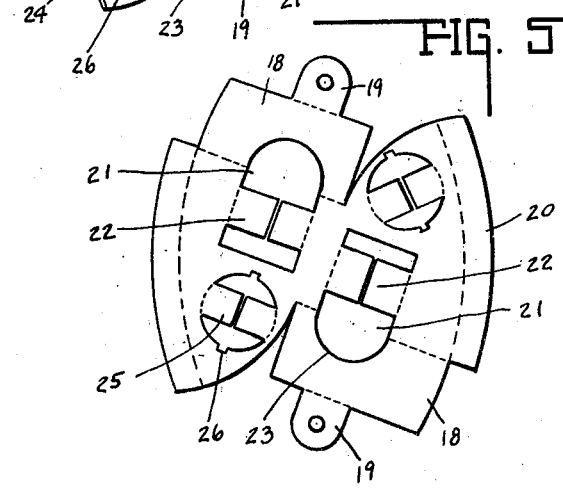
INVENTOR.
FREDERICK W. C. NEUNER.
BY
ATTORNEYS.

Patented Oct. 28, 1930

1,779,634

UNITED STATES PATENT OFFICE

FREDERICK W. C. NEUNER, OF CONNERSVILLE, INDIANA, ASSIGNOR TO INDIANA LAMP CORPORATION, OF CONNERSVILLE, INDIANA, A CORPORATION

LAMP-BULB KIT

Application filed August 17, 1928. Serial No. 300,218.

This invention relates to the construction of a kit for conveniently carrying a set of lamp bulbs for automobile use, including a pair of headlight bulbs and a pair of cowl, tail or signal light bulbs.

The principal object of the invention lies in the provision of a suitable container embodying the shell of material in such form as to make it light, economical for manufacture, and consume a minimum of space.

The feature of the invention resides in the provision of a bulb support secured within the casing which is so formed as to retain the lamp bulbs in place and position them in such manner as to not only consume a minimum of space within the casing but so that there will be no contact between the glass bulbs and casing whereby danger of breakage will be minimized.

The full nature of the invention will be more clearly understood from the accompanying drawings and the following description and claims.

Fig. 1 is a plan view of the kit with the cover removed and showing the two headlight bulbs mounted therein and the smaller bulbs removed. Fig. 2 is a central longitudinal section through the casing showing one of the headlight bulbs and a smaller bulb in elevation. Fig. 3 is a plan view of the bulb support with the bulbs removed. Fig. 4 is a section taken on the line 4—4 of Fig. 3. Fig. 5 is a plan view of the blank before being formed into the support.

In the drawings there is shown a casing which embodies the bottom portion 10 and the cover 11, said casing being of an oval shape as shown in Fig. 1. Secured to the bottom 10 by the rivets 12 there is a support 13 for supporting in properly spaced position the headlight bulbs 14 and the smaller bulbs 15 through the medium of their respective base plugs 16 and 17.

The support comprises a platform 13ª supported in spaced relation from the bottom 10 by the downwardly extending flanges 18 which are provided with the ears 19 adapted to be riveted to the bottom by the rivets 12. The side flanges indicated at 20 are bent downwardly to abut the sides of the casing for centering and maintaining the support in proper position with respect thereto. In the platform 13ª of the support there is formed a socket for receiving the base plug of the larger headlight bulbs, as indicated at 21, said socket having downwardly turned ears 22 and a semi-spherical support 23 for supporting the forward end thereof. Said sockets 21 are disposed in parallel relation but open in opposite directions so that the lamp bulbs supported thereby will extend into opposite ends of the casing. For supporting the small lamps 15, there are annular openings formed in the platform 13ª, as indicated at 24, adapted to receive the base plug of the smaller socket in vertical position as distinguished from the horizontal position in which the larger bulb is supported. Said openings are formed with the ears 25 which are bent downwardly so as to embrace the base plug on each side thereof and maintain it in upright position.

Recesses 26 are provided in connection with the opening 24 through which the bayonet pins may pass when the bulb is mounted in position.

From the foregoing it will be noted that the support 13 removably retains the various lamps in a firm position and thereby prevents contact of the bulbs with each other or the casing with a minimum of space.

The invention claimed is:

1. In a container for lamp bulbs, the combination with an oval casing, of a support mounted therein adapted to receive a pair of relatively large and small lamp bulbs and removably secure them in fixed position with respect to said casing, said support having a platform portion spaced from the bottom of the casing, means for supporting said platform portion in the casing, substantially rectangular recesses formed in said platform portion opening toward the ends of said casing in opposite directions to each other, annular openings in said platform portion, and downwardly extending ears formed in said openings for embracing the base plugs of the lamps and frictionally securing the relatively large lamps in horizontal position with the bulbs extending to the ends of the casing and the relatively small bulbs in vertical position on each side thereof, all of said lamps being secured with the bulb portions out of contact with said support and casing.

2. A lamp bulb kit including a substantially elliptical casing member, a similarly shaped cover member therefor, a partition medianly positioned within the kit and supported by one of said members, said partition having a plurality of recesses each adapted to receive the base plug of a lamp bulb, and members formed about each of said recesses for grasping said base plugs for supporting said lamp bulbs with their bulb portions out of contact with said partition, casing and cover, two of said recesses being arranged to support their lamb bulbs with their axes substantially parallel to the plane of said partition and the bulb portions thereof extending into the ends of said casing and the remaining recesses being formed to support their lamp bulbs with their axes substantially transverse to the plane of said partition.

In witness whereof, I have hereunto affixed my signature.

FREDERICK W. C. NEUNER.